United States Patent [19]

Siwiak et al.

[11] Patent Number: 5,432,521

[45] Date of Patent: Jul. 11, 1995

[54] SATELLITE RECEIVER SYSTEM HAVING DOPPLER FREQUENCY SHIFT TRACKING

[75] Inventors: Kazimierz Siwiak, Coral Springs; Lorenzo A. Ponce de Leon, Lake Worth, both of Fla.

[73] Assignee: Motorola, Inc., Schaumburg, Ill.

[21] Appl. No.: 186,393

[22] Filed: Jan. 14, 1994

[51] Int. Cl.[6] .......................... H04B 7/185; G01S 5/02
[52] U.S. Cl. .................................... 342/357; 455/12.1
[58] Field of Search ............. 342/357; 455/12.1, 182.2

[56] References Cited

U.S. PATENT DOCUMENTS

| | | | |
|---|---|---|---|
| 4,691,176 | 9/1987 | Hsiung et al. | 331/2 |
| 4,823,123 | 4/1989 | Siwiak . | |
| 5,008,952 | 4/1991 | Davis et al. . | |
| 5,010,317 | 4/1991 | Schwendeman et al. . | |
| 5,016,257 | 5/1991 | Wolf et al. | 375/1 |
| 5,109,544 | 4/1992 | Mittel et al. . | |
| 5,121,503 | 6/1992 | Davis . | |
| 5,129,095 | 7/1992 | Davis et al. . | |
| 5,239,670 | 8/1993 | Schwendeman et al. . | |

OTHER PUBLICATIONS

R. E. Ziemer and W. H. Tranter, *Principles of Communications Systems, Modulation, and Noise*, pp. 170–171, 1985, U.S.A.

*Primary Examiner*—Theodore M. Blum
*Attorney, Agent, or Firm*—R. Louis Breeden

[57] ABSTRACT

A satellite receiver system provides acquisition and frequency tracking of a Doppler-shifted radio signal received from an orbiting satellite. The satellite receiver system includes a Costas phase-lock loop that receives the radio signal and provides an error signal at an error signal output for controlling a conversion frequency generated by a voltage controlled oscillator. The voltage controlled oscillator is coupled to the Costas phase-lock loop and generates the conversion frequency for down-converting the radio signal in the Costas phase-lock loop. The satellite receiver system further includes a Doppler frequency acquisition and tracking element coupled to the voltage controlled oscillator. The Doppler frequency acquisition and tracking element adjusts the conversion frequency to compensate for a Doppler frequency shift occurring in the radio signal due to orbital motion of the orbiting satellite.

16 Claims, 6 Drawing Sheets

SATELLITE RECEIVER SYSTEM HAVING DOPPLER FREQUENCY SHIFT TRACKING

FIELD OF THE INVENTION

This invention relates in general to radio communication receivers, and more specifically to a radio communication receiver system that provides frequency tracking of a Doppler shifted radio signal.

BACKGROUND OF THE INVENTION

Communication systems utilizing direct transmission of signals from orbiting satellites to Earth-based receivers are well known. Such systems have been described in U.S. Pat. No. 5,121,503 to Davis, entitled "Satellite Signaling System Having a Signal Beam with a Variable Beam Area," and in U.S. Pat. No. 5,239,670 to Schwendeman et al., entitled "Satellite Based Global Paging System." Said U.S. patents are hereby incorporated herein by reference.

A radio signal transmitted from a non-geostationary satellite, e.g., a Low Earth Orbit satellite, can present reception difficulties due to large Doppler frequency shifts caused by orbital motion of the satellite. Because of the high cost of transmitter power in satellite communication systems, earth based receivers used in such systems require high sensitivity to achieve adequate system gain. High sensitivity can be achieved by utilizing a narrow bandwidth, phase coherent receiver, such as a binary phase shift keyed (BPSK) receiver, and further by utilizing differential encoding for the transmitted data.

Unfortunately, the Doppler frequency shift in such a system can be significantly larger than the receiver bandwidth required for high sensitivity. This condition makes it impossible for the receiver to acquire the radio signal except during a brief period in which the satellite is most directly overhead, and thus is producing a limited velocity component with respect to the receiver. Without the Doppler frequency shift, it would be possible for the receiver to receive the satellite transmissions for a much greater period during which the satellite antenna is "in view" of the receiver antenna.

Thus, what is needed is a satellite receiver system that provides acquisition and frequency tracking of a Doppler shifted radio signal to allow narrow-band reception of the radio signal from an orbiting satellite for substantially the entire period during which the satellite is in view of the satellite receiver system.

SUMMARY OF THE INVENTION

An aspect of the present invention is a satellite receiver system that provides acquisition and frequency tracking of a Doppler-shifted radio signal received from an orbiting satellite. The satellite receiver system comprises a Costas phase-lock loop that receives the radio signal and provides an error signal at an error signal output for controlling a conversion frequency generated by a voltage controlled oscillator. The satellite receiver system further comprises the voltage controlled oscillator, which is coupled to the Costas phase-lock loop and generates the conversion frequency for down-converting the radio signal in the Costas phase-lock loop. The voltage controlled oscillator comprises a programmable frequency synthesizer that can be programmed to generate a plurality of frequencies selectable in steps. The satellite receiver system further comprises a Doppler frequency acquisition and tracking element coupled to the voltage controlled oscillator. The Doppler frequency acquisition and tracking element adjusts the conversion frequency to compensate for a Doppler frequency shift occurring in the radio signal due to orbital motion of the orbiting satellite. The Doppler frequency acquisition and tracking element comprises a coarse adjustment element coupled to the programmable frequency synthesizer for selecting a suitable one of the plurality of frequencies to provide a coarse adjustment of the conversion frequency to compensate for the Doppler frequency shift, and a fine adjustment element coupled to the error signal output for generating a fine adjustment signal at an adjusted error signal output for providing a fine adjustment of the conversion frequency to compensate for the Doppler frequency shift.

Another aspect of the present invention is a satellite receiver system that provides acquisition and frequency tracking of a Doppler-shifted radio signal received from an orbiting satellite. The satellite receiver system comprises a Costas phase-lock loop that receives the radio signal and provides an error signal at an error signal output for controlling a conversion frequency generated by a voltage controlled oscillator. The satellite receiver system further comprises the voltage controlled oscillator, which is coupled to the Costas phase-lock loop and generates the conversion frequency for down-converting the radio signal in the Costas phase-lock loop. The satellite receiver system further comprises a Doppler frequency acquisition and tracking element coupled to the voltage controlled oscillator. The Doppler frequency acquisition and tracking element adjusts the conversion frequency to compensate for a Doppler frequency shift occurring in the radio signal due to orbital motion of the orbiting satellite. The Doppler frequency acquisition and tracking element comprises a fine adjustment element coupled to the error signal output for generating a fine adjustment signal at an adjusted error signal output for providing fine adjustment of the conversion frequency to compensate for the Doppler frequency shift.

DESCRIPTION OF THE PREFERRED EMBODIMENT

Figure 1:
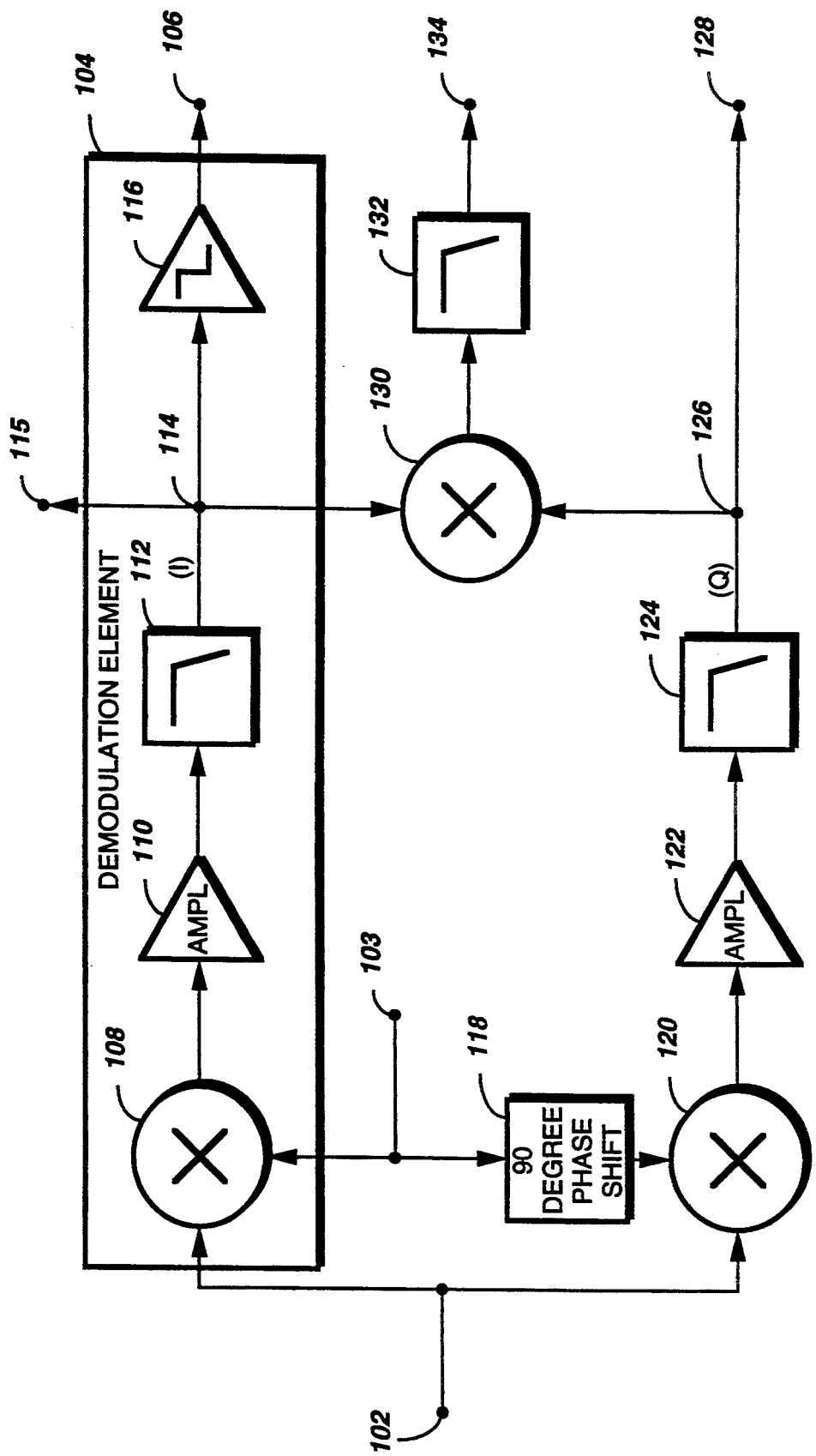
FIG. 1 is an electrical block diagram of a conventional Costas phase-lock loop.

Referring to FIG. 1, an electrical block diagram of a conventional Costas phase-lock loop 100 comprises a received signal input 102 coupled to first and second mixers 108, 120 for receiving a radio signal. The first mixer 108 receives a conversion frequency directly from a conversion frequency input 103. The second mixer 120 receives the same conversion frequency, phase shifted by ninety degrees in a phase shift element 118. The first and second mixers 108, 120 are coupled through first and second amplifiers 110, 122 and first and second baseband data filters 112, 124 to produce in-phase (I) and quadrature (Q) signals at first and second nodes 114, 126, respectively. The first and second nodes 114, 126 are coupled to a third mixer 130, which is coupled through an automatic frequency control (AFC) filter 132 to produce an error signal at an error signal output 134 for controlling the conversion frequency generated by a voltage controlled oscillator 200 (FIG. 2), as described herein below. The first and second nodes 114, 126 also are coupled to first and second power measurement outputs 115, 128, and thence to a power measurement element 312 (FIG. 3) for measuring received power of the radio signal. The first node 114 is further coupled to a limiter 116 for producing a demodulated data bit stream at a data output 106. The first mixer 108, the first amplifier 110, the first baseband data filter 112 and the limiter 116 form a demodulation element 104 for demodulating the radio signal to derive the demodulated data bit stream. The modulation is preferably differentially encoded binary phase-shift keyed (DE-BPSK) modulation. It will be appreciated that double sideband amplitude modulation and non-differentially encoded BPSK modulation can be demodulated as well by the Costas phase-lock loop 100.

Figure 2:
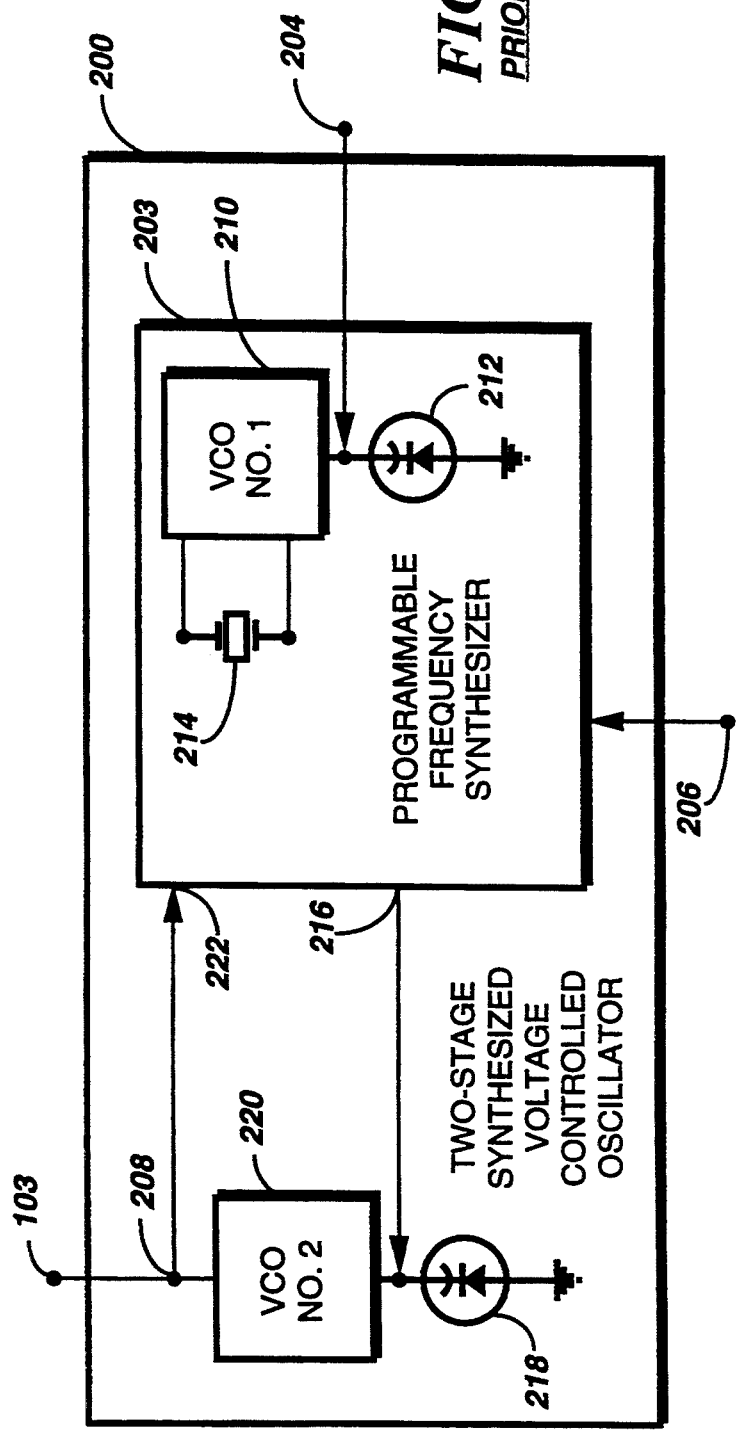
FIG. 2 is an electrical block diagram of a conventional two-stage synthesized voltage controlled oscillator.

Referring to FIG. 2, an electrical block diagram of a conventional two-stage synthesized voltage controlled oscillator (VCO) 200 comprises a fine frequency control input 204 and a stepped frequency programming input 206. The fine frequency control input 204 is coupled to a first varactor diode 212 for "warping" a frequency generated by a first VCO 210 controlled by a reference crystal 214. The first VCO 210 is utilized in a conventional manner to generate a frequency reference for a programmable frequency synthesizer 203. The stepped frequency programming input 206 is coupled to the programmable frequency synthesizer 203 to allow selection of one of a plurality of output frequencies selectable in steps. An error output 216 of the programmable frequency synthesizer 203 is coupled to a second varactor diode 218 for warping a frequency generated by a second VCO 220. The frequency generated by the second VCO 220 is available at a VCO output node 208, which is coupled to a count-down input 222 of the programmable frequency synthesizer 203 for feedback and count-down of the frequency generated by the second VCO 220 in a conventional manner. The VCO output node 208 is also coupled to the conversion frequency input 103 of the Costas phase-lock loop 100 (FIG. 1) for supplying the conversion frequency utilized for down converting the received radio signal to baseband.

Figure 3:
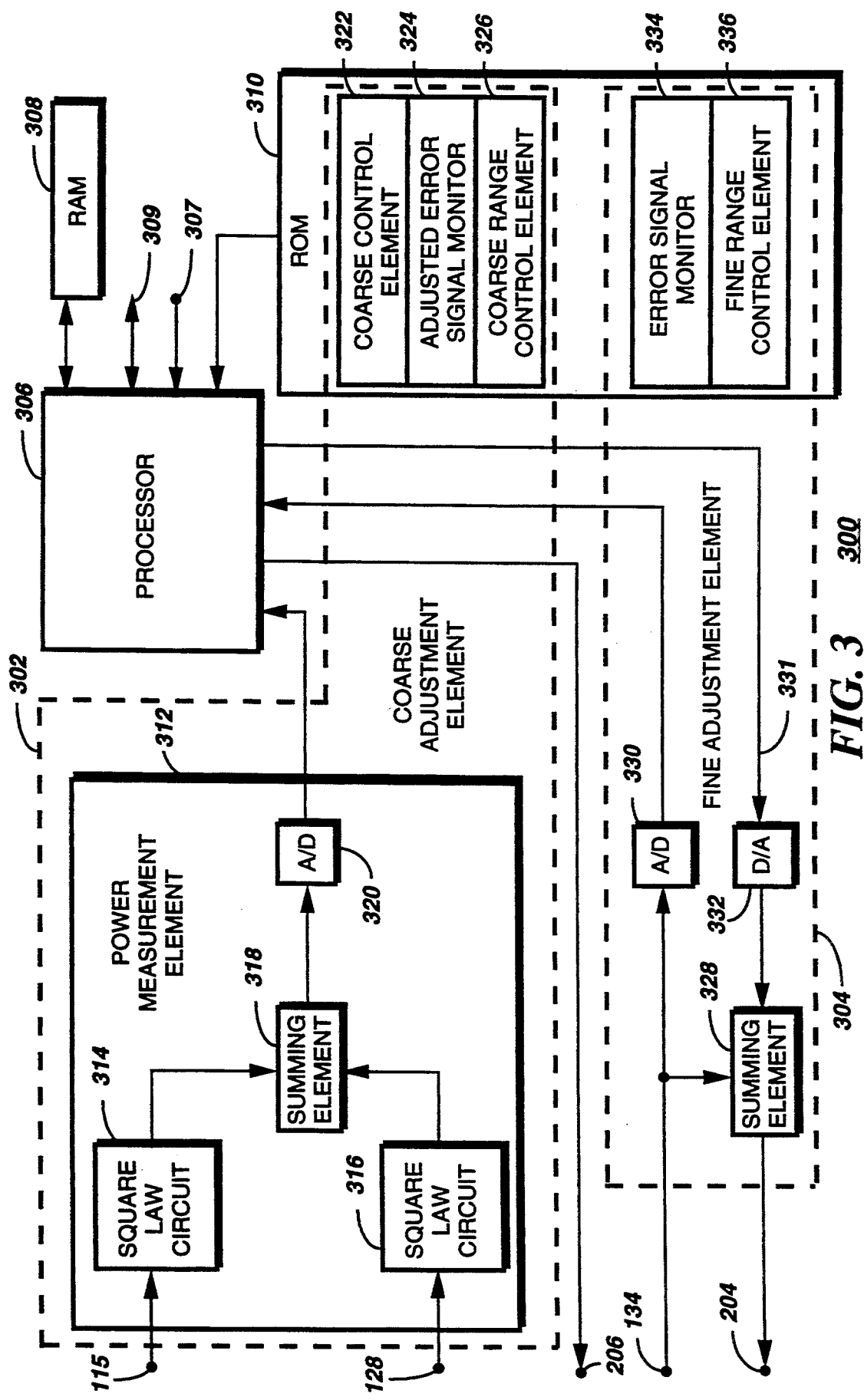
FIG. 3 is an electrical block diagram of a Doppler frequency acquisition and tracking element in accordance with the preferred embodiment of the present invention.

Referring to FIG. 3, an electrical block diagram of a Doppler frequency acquisition and tracking element 300 in accordance with the preferred embodiment of the present invention is depicted. The Doppler frequency acquisition and tracking element 300 comprises a coarse adjustment element 302 for adjusting the conversion frequency generated by the VCO 200 in steps, and a fine adjustment element 304 for providing fine adjustment of the conversion frequency. The Doppler frequency acquisition and tracking element 300 further comprises a processor 306 coupled to the coarse and fine adjustment elements 302, 304 and coupled through the fine adjustment element 304 to the fine frequency control input 204 of the VCO 200. The processor 306 is also coupled to the stepped frequency programming input 206 of the VCO 200, and controls the conversion frequency generated therefrom in response to signals from the coarse and fine adjustment elements 302, 304. The processor 306 is preferably a digital signal processor (DSP) similar to the DSP56000 digital signal processor manufactured by Motorola, Inc. of Schaumburg, Ill. It will be appreciated that other similar devices can be utilized for the processor 306 as well.

The processor 306 is also coupled to a conventional random access memory (RAM) 308 for temporary storage of operational values and to a conventional read-only memory (ROM) 310, which contains firmware elements for controlling the Doppler frequency acquisition and tracking element 300 in accordance with the preferred embodiment of the present invention. The processor 306 is further coupled to a bus 309 and a serial data input 307 for communicating with additional elements of a satellite receiver system, as will be described herein below in reference to FIG. 4.

Firmware elements forming a portion of the fine adjustment element 304 comprise an error signal monitor 334 for monitoring an error signal present at the error signal output 134 of the Costas phase-lock loop 100 to determine whether the error signal is within a first predetermined operating range demarked by low and high limits. The firmware elements of the fine adjustment element 304 further comprise a fine range control element 336 wherein, after a radio signal has been acquired, the fine range control element 336 adjusts a fine adjustment signal supplied by the fine adjustment element 304 to generate an adjusted error signal at the fine frequency control input 204 of the VCO 200. The fine adjustment signal is decremented by a fine adjustment value equal to the first predetermined operating range in response to the error signal being below the low limit, and is incremented by the same fine adjustment value in response to the error signal being above the high limit. In this manner the fine adjustment element 304 acts to maintain the error signal within the first predetermined operating range.

Firmware elements forming a portion of the coarse adjustment element 302 comprise a coarse control element 322 for selecting a suitable one of a plurality of frequencies to provide a coarse adjustment of the conversion frequency to compensate for Doppler frequency shift. The firmware elements of the coarse adjustment element 302 further comprise an adjusted error signal monitor 324 for monitoring the adjusted error signal at the fine frequency control input 204 to determine whether the adjusted error signal is within a second predetermined operating range demarked by first and second limits, wherein the conversion frequency corresponding to the first limit is a lower frequency than that corresponding to the second limit. The firmware elements of the coarse adjustment element 302 also include a coarse range control element 326 for controlling the VCO 200 to generate a next lower one of the plurality of frequencies and simultaneously controlling the fine adjustment element 304 to set the adjusted error signal to a value substantially equal to the second limit, in response to the adjusted error signal being outside of the second predetermined operating range in a direction beyond the first limit.

The fine adjustment element 304 further comprises a first conventional analog-to-digital (A/D) converter 330 for converting the error signal present at the error signal output 134 into a digital value readable by the processor 306. The fine adjustment element 304 also includes a conventional digital-to-analog (D/A) converter 332 for converting a digital representation of the fine adjustment signal on a control path 331 from the processor 306 into an analog signal, which is added with the error signal in a first conventional analog summing element 328 to generate the adjusted error signal at the fine frequency control input 204 of the VCO 200.

The coarse adjustment element 302 further comprises a power measurement element 312, including two conventional square law circuits 314, 316, coupled respectively to the first and second power measurement outputs 115, 128 of the Costas phase-lock loop 100. The output signals from the square law circuits 314, 316 are summed in a second conventional analog summing element 318 to produce a power level signal, which is converted into a digital signal in a second conventional A/D converter 320 for processing by the processor 306. The power level signal is proportional to the received power, i.e., the sum of the squares of the signals I and Q present at the first and second power measurement outputs 115, 128, respectively.

Preferably, the D/A converter 332 and the A/D converters 320, 330 are similar to the D/A and A/D circuits found in the DSP56166 digital signal processor chip manufactured by Motorola, Inc. of Schaumburg, Ill. The analog summing elements 318, 328 preferably are conventional operational amplifiers available off-the-shelf. Preferably, the square law circuits 314, 316 are similar to the MC1494L/1594L linear four quadrant multiplier manufactured by Motorola, Inc. of Schaumburg, Ill. It will be appreciated that other similar devices can be used as well for the A/D converters 320, 330, the D/A converter 332, the analog summing elements 318, 328, and the square law circuits 314, 316.

Figure 4:
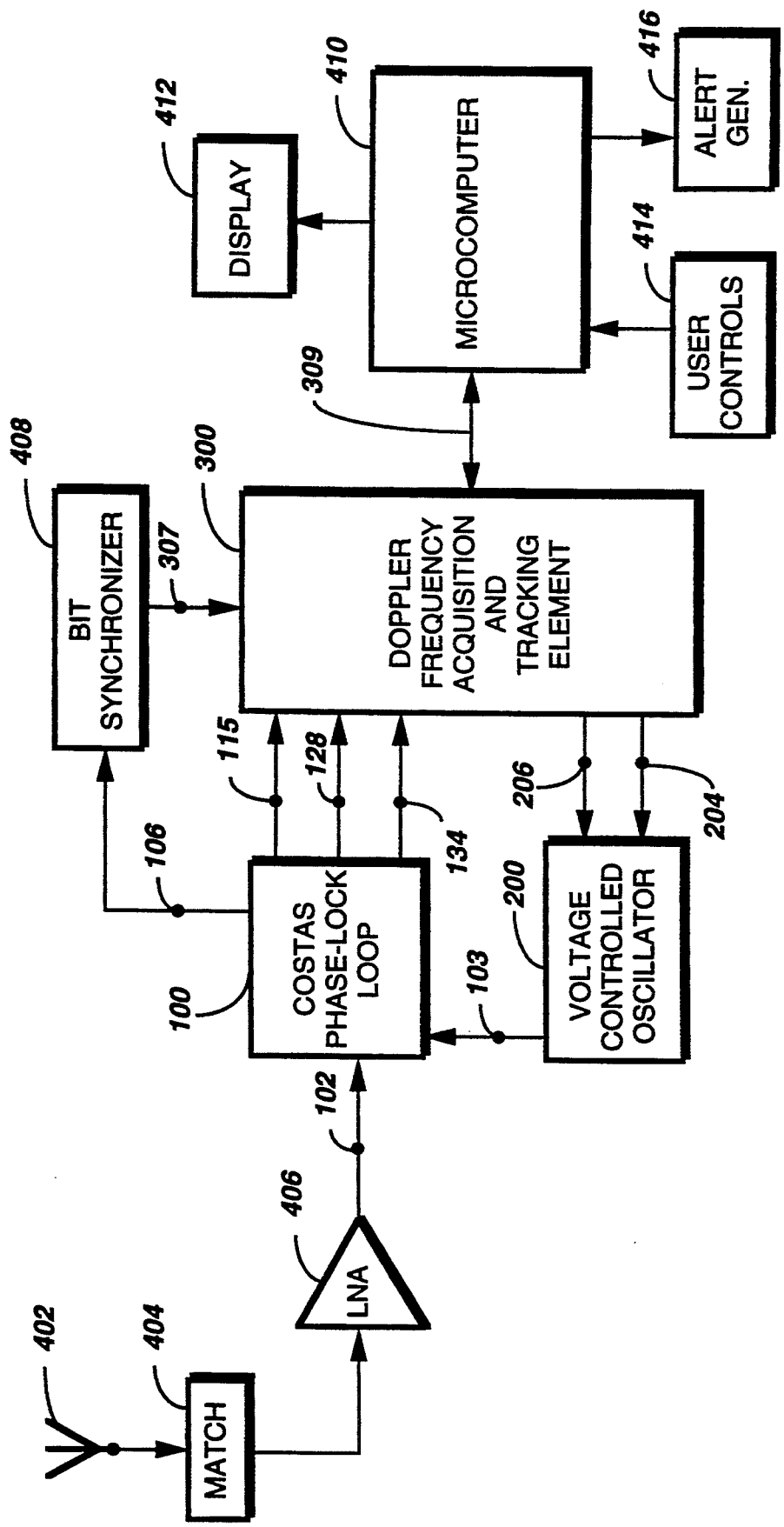
FIG. 4 is an electrical block diagram of a satellite receiver system in accordance with the preferred embodiment of the present invention.

Referring to FIG. 4, an electrical block diagram of a satellite receiver system 400 in accordance with the preferred embodiment of the present invention comprises an antenna 402 coupled through a conventional matching element 404 to a conventional low-noise amplifier (LNA) 406 for receiving and amplifying a radio signal. The LNA 406 is coupled to the received signal input 102 of the Costas phase-lock loop 100 for down-converting and demodulating the radio signal to derive the demodulated data bit stream at the data output 106. The data output 106 is coupled to a conventional bit synchronizer 408 for delivering the demodulated data bit stream to the serial data input 307 of the Doppler frequency acquisition and tracking element 300.

Preferably, the matching element 404, the LNA 406, and the bit synchronizer 408 are similar to those utilized in the model A03KLB5962CA ADVISOR® pager, manufactured by Motorola, Inc. of Schaumburg, Ill. It will be appreciated that other similar devices can be used as well for the matching element 404, the LNA 406, and the bit synchronizer 408.

The first and second power measurement outputs 115, 128 of the Costas phase-lock loop 100 are also coupled to the Doppler frequency acquisition and tracking element 300 for providing the I and Q signals thereto for power measurement in the power measurement element 312. In addition, the error signal output 134 of the Costas phase-lock loop 100 is coupled to the Doppler frequency acquisition and tracking element 300 for adjustment thereof to correct for Doppler frequency shift in accordance with the preferred embodiment of the present invention. The fine frequency control input 204 and the stepped frequency programming input 206 of the VCO 200 are coupled to the Doppler frequency acquisition and tracking element 300 for controlling the conversion frequency generated from the VCO 200. The VCO 200 is also coupled to the conversion frequency input 103 of the Costas phase-lock loop 100 for supplying the conversion frequency thereto.

The satellite receiver system 400 further comprises a microcomputer 410 coupled to the Doppler frequency acquisition and tracking element 300 by the bus 309. The microcomputer 410 provides control of the satellite receiver system 400 and is preferably similar to the MC68HC05, C08, or C11 series microcomputers, or a DSP56000 series digital signal processor, all manufactured by Motorola, Inc. of Schaumburg, ILL. It will be appreciated that other similar devices may be utilized for the microcomputer 410 as well. The microcomputer 410 is also coupled to a display 412, such as a conventional liquid crystal display, for displaying received information. In addition, the microcomputer 410 is coupled to user controls 414, such as well-known buttons and switches for allowing a user to control operation of the satellite receiver system 400. An alert generator 416, such as a conventional piezoelectric sounder, is also coupled to the microcomputer 410 for alerting the user whenever information intended for the satellite receiver system 400 is received.

The utilization of the Doppler frequency acquisition and tracking element 300 in accordance with the preferred embodiment of the present invention advantageously allows the satellite receiver system 400 to acquire, track, and receive Doppler shifted satellite transmissions for substantially the entire period during which the satellite is in view of the satellite receiver system 400. This is possible even though the satellite receiver system 400 preferably has a narrow receiver bandwidth (required for high sensitivity) substantially smaller than the Doppler frequency shift encountered over the entire period during which the satellite is in view of the satellite receiver system 400. The method by which the satellite receiver system 400 operates to provide Doppler frequency acquisition and tracking will be described further below.

Figure 5:
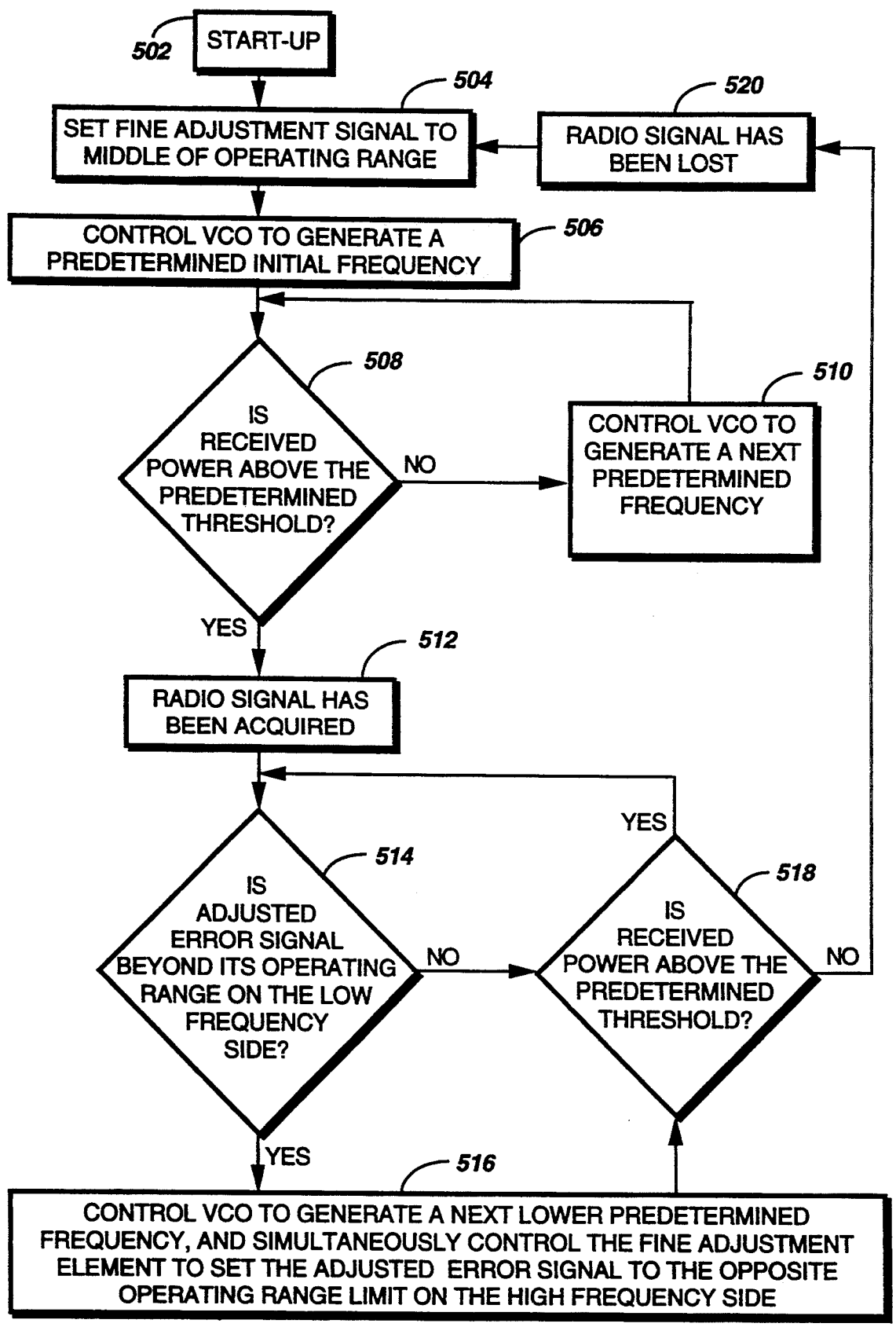
FIG. 5 is a flow chart depicting operation of a processor and a coarse adjustment element in accordance with the preferred embodiment of the present invention.

Referring to FIG. 5, a flow chart depicting operation of the processor 306 and the coarse adjustment element 302 in accordance with the preferred embodiment of the present invention begins with start-up 502 of the satellite receiver system 400. Following start-up, the processor 306 accesses the coarse control element 322 and controls the fine adjustment element 304 to set 504 the fine adjustment signal to the middle of its operating range. Then the processor 306 controls 506 the VCO 200 through the stepped frequency programming input 206 to generate a predetermined initial conversion frequency.

The predetermined initial conversion frequency is selected to be a "statistically predominant" Doppler shifted frequency at the time of initial acquisition of a transmission from an approaching satellite. By "statistically predominant" is meant a Doppler shifted frequency that is statistically most likely from an approaching satellite. A satellite that is in view is most likely to pass at an elevation of approximately 35 degrees above the horizon, not directly overhead. This means that the statistically predominant initial Doppler shift for an approaching satellite is a positive shift of substantially less than the maximum possible Doppler shift, i.e., the Doppler shift produced if the satellite passes directly overhead. For example, in the case of a system operating near 1624 MHz, the maximum Doppler shift is ±36 KHz for a Low Earth Orbit satellite passing directly overhead, while the statistically predominant initial Doppler shift for an approaching satellite is about ±20 KHz. Thus, for the example system a good choice of predetermined initial conversion frequency is 20 KHz above the nominal operating frequency of the system. In addition to adjusting the conversion frequency to compensate for Doppler shift, it is necessary to adjust the conversion frequency to compensate for frequency inaccuracy inherent in the reference crystal 214. For the example system, a ±10 parts per million reference crystal tolerance would produce about ±16 KHz frequency variation, for a total frequency variation of ±52 KHz. The combination of the reference crystal inaccuracy and the uncertain amount of Doppler frequency shift being encountered usually make it necessary to hunt about the predetermined initial conversion frequency in some manner to search for the best frequency for initially acquiring lock with the radio signal from the satellite, as described below.

In step 508 the processor 306 evaluates the signal from the power measurement element 312 to determine if the received power is above a predetermined threshold, e.g., above a level that will insure a sufficiently low bit error rate. If not, the processor 306 controls 510 the VCO 200 to generate a next predetermined conversion frequency, followed by another until the received power is determined to be above the predetermined threshold. For example, a search sequence of +20, +30, +40, +50, +40, +30, +20, +10, 0, −10, −20, −30, −40, −50, −40, −30, −20, −10, 0, +10, +20 KHz, and so forth, preferably is utilized to locate a conversion frequency that initially acquires lock with the radio signal.

When the radio signal has been acquired 512, the processor 306 accesses the adjusted error signal monitor 324 to check 514 whether the adjusted error signal is beyond a predetermined operating range on the low frequency side. The adjusted error signal is the signal present at the fine frequency control input 204 of the VCO 200, the signal comprising the sum of the error signal from the Costas phase-lock loop 100 and the analog fine adjustment signal generated under control of the processor 306 by the fine adjustment element 304. The operating range of the adjusted error signal is limited by the usable frequency warping range of the first varactor diode 212. The reason for checking only the low frequency side of the operating range is that the Doppler shifted frequency of the satellite always decreases monotonically after initial signal acquisition.

If in step 514 the adjusted error signal is not beyond its operating range on the low frequency side, then the processor 306 checks 518 whether the received power as indicated by the power measurement element 312 is still above the predetermined threshold. If so, the processor loops back to step 514 to continue checking for an out-of-range adjusted error signal. If, on the other hand, in step 518 the received power is not above the predetermined threshold, then the radio signal has been lost 520, and the flow returns to step 504 to search for another radio signal. If in step 514 the adjusted error signal is determined to be beyond its operating range on the low frequency side, then the processor 306 accesses the coarse range control element 326 to control 516 the VCO 200 to generate a next lower predetermined frequency and to simultaneously control the fine adjustment element 304 to set the adjusted error signal to the opposite operating range limit on the high frequency side. Preferably, the net result of step 516 is to produce substantially no change in the conversion frequency generated by the VCO 200. For example, if the next lower frequency generated by the VCO 200 would have been 10 KHz lower, then setting the adjusted error signal to the opposite operating range limit on the high frequency side should move the conversion frequency substantially 10 KHz higher, for a net zero change in frequency. Following step 516, the flow returns to loop through steps 518 and 514 to continue to maintain the adjusted error signal within its operating range until the radio signal is lost.

It will be appreciated that step 516, if executed during the reception of data, would be likely to cause bit errors in the received data. Thus, the coarse range control element 326 preferably limits the execution of step 516 to those times during which data is not being received. Such operation preferably is facilitated by designing the system such that the satellite transmissions send the data in packets of predetermined periodicity separated by intervals of no data, wherein each packet includes initial synchronization information that allows the satellite receiver system 400 to reacquire phase lock to the radio signal following the execution of step 516.

Figure 6:
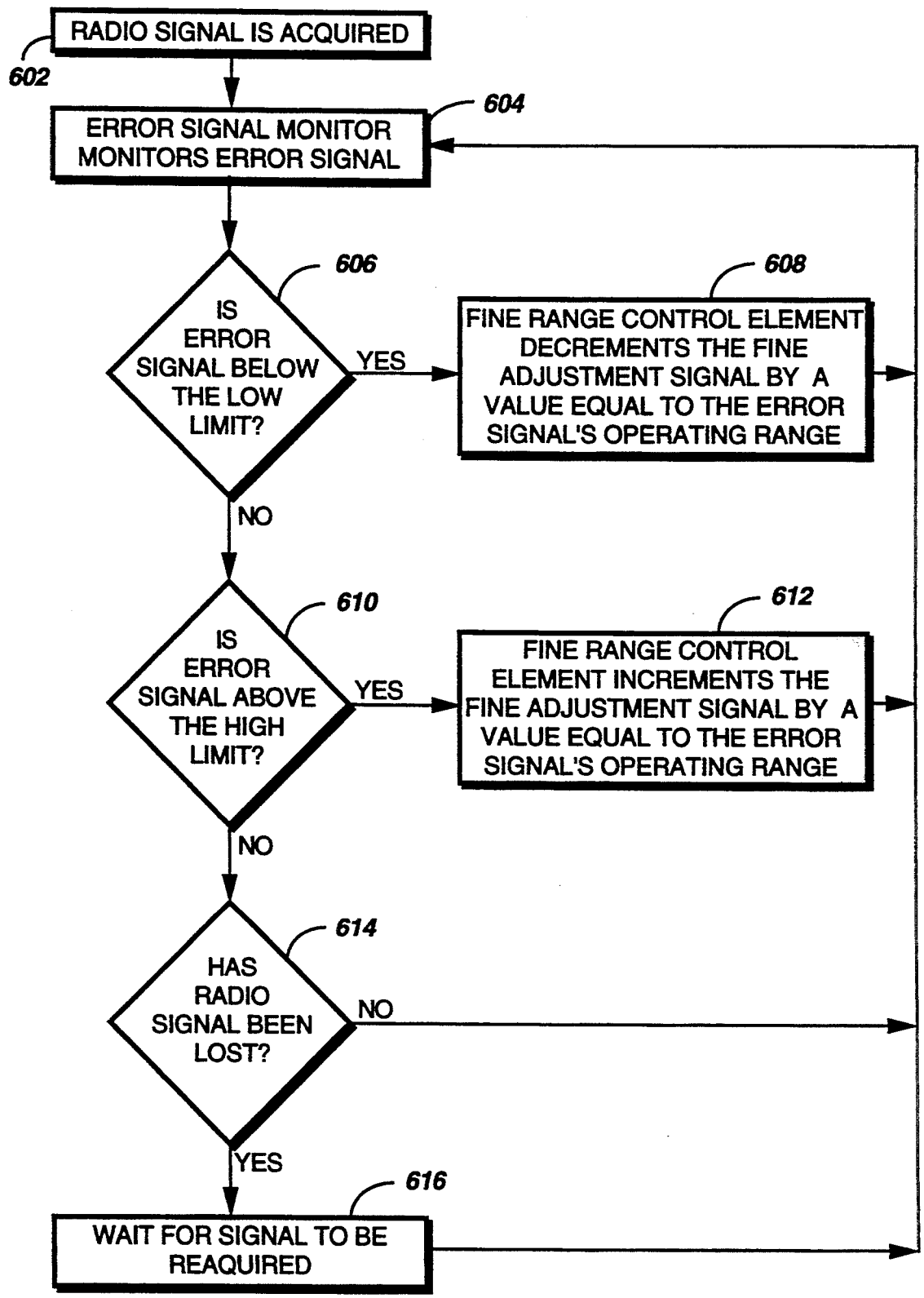
FIG. 6 is a flow chart depicting operation of the processor and a fine adjustment element in accordance with the preferred embodiment of the present invention.

Referring to FIG. 6, a flow chart depicting operation of the processor 306 and the fine adjustment element 304 in accordance with the preferred embodiment of the present invention begins with acquisition 602 of the radio signal by the satellite receiver system 400, as described herein above. After signal acquisition, the processor 306 accesses the error signal monitor 334 and monitors 604 the error signal from the Costas phase-lock loop 100. If in step 606 the error signal is below a low limit of its predetermined operating range, the processor 306 accesses 608 the fine range control element 336 and decrements 608 the fine adjustment signal by a value equal to the operating range of the error signal, after which flow returns to step 604. The Costas phase-lock loop 100 will quickly increase the error signal to return the adjusted error signal to its former value for maintaining lock with the radio signal. The net result will be to move the error signal to the opposite (high) limit of its operating range, thereby keeping the error signal within the predetermined operating range.

If in step 606 the error signal is not below a low limit of its predetermined operating range, the processor 306 checks 610 whether the error signal is above a high limit of its predetermined operating range. If so, the processor 306 increments 612 the fine adjustment signal by a value equal to the operating range of the error signal, after which flow returns to step 604. The Costas phase-lock loop 100 will quickly reduce the error signal to return the adjusted error signal to its former value for maintaining lock with the radio signal. The net result will be to move the error signal to the opposite (low) limit of its operating range, thereby keeping the error signal within the predetermined operating range.

If in step 610 the error signal is not above a high limit of its predetermined operating range, then the processor 306 checks 614 whether the radio signal has been lost. If not, flow returns to step 604 to continue monitoring the error signal. If the radio signal has been lost, the processor 306 waits 616 for the signal to be reacquired and then flow returns to step 604.

As discussed above regarding step 516 (FIG. 5), it will be appreciated that either step 608 or step 612, if executed during the reception of data, would be likely to cause bit errors in the received data. Thus, the fine range control element 336 preferably also limits the execution of steps 608 and 612 to those times during which data is not being received. As stated above, such operation preferably is facilitated by designing the system such that the satellite transmissions send the data in packets of predetermined periodicity separated by intervals of no data, wherein each packet includes initial synchronization information that allows the satellite receiver system 400 to reacquire phase lock to the radio signal following the execution of either step 608 or step 612.

Figure 7:
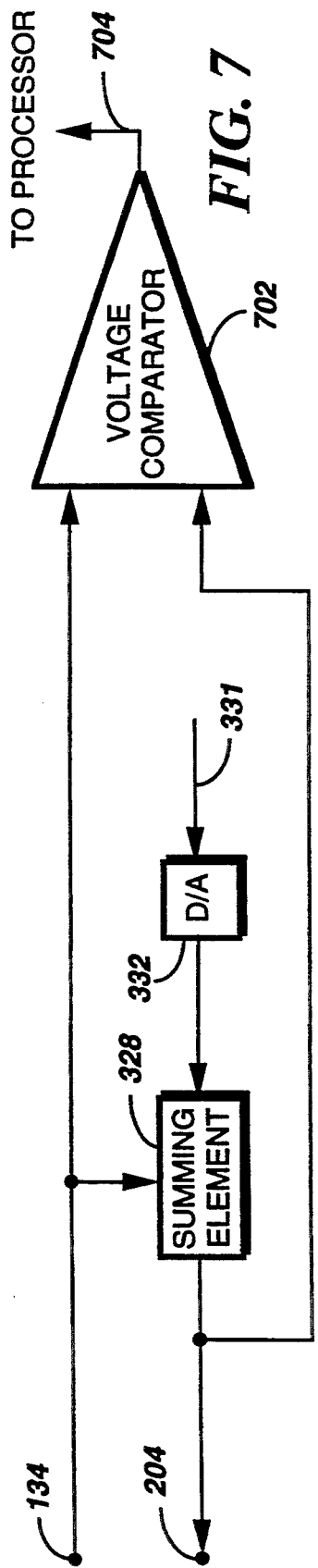
FIG. 7 is an electrical block diagram of an error signal monitor element in accordance with an alternative embodiment of the present invention.

Referring to FIG. 7, an electrical block diagram of an error signal monitor element in accordance with an alternative embodiment of the present invention comprises a voltage comparator 702 having a comparison output 704 coupled to the processor 306. The voltage comparator 702 compares the error signal present on the error signal output 134 of the Costas phase-lock loop 100 and the adjusted error signal present at the output of the first summing element 328. The comparison output 704 indicates to the processor 306 whether the error signal from the Costas phase-lock loop 100 is attempting to correct the adjusted error signal positively or negatively compared to the amount of correction currently provided by the fine adjustment value supplied by the control path 331. The processor 306 then readjusts the fine adjustment value towards the direction of the correction being presented by the Costas phase-lock loop 100, thereby reducing the amount of correction required therefrom. By monitoring the fine adjustment value, the processor 306 also determines when the adjusted error signal is about to go beyond its operating range on the low frequency side. Then the processor 306 controls the VCO 200 to generate a next lower predetermined frequency and simultaneously generates a new fine adjustment value to set the adjusted error signal to the opposite operating range limit on the high frequency side. In this manner the processor 306 maintains the adjusted error signal within an operating range suitable for warping the first varactor diode 212, as described herein above in regard to the preferred embodiment of the present invention.

Thus, the preferred embodiment of the present invention is a satellite receiver system that provides acquisition and frequency tracking of a Doppler shifted radio signal to allow reception of the radio signal from an orbiting satellite for substantially the entire period during which the satellite is in view of the satellite receiver system. The satellite receiver system allows a receiver bandwidth much narrower than the total range of Doppler-shifted frequencies that result from the orbital motion of the satellite relative to the receiver system. The narrow receiver bandwidth advantageously provides high receiver sensitivity, thereby allowing the transmitter power of the satellite to be substantially reduced, compared to the transmitter power that would be required for use with a conventional receiver system having a bandwidth wide enough to lock with the total range of Doppler-shifted frequencies.

What is claimed is:

1. A satellite receiver system that provides acquisition and frequency tracking of a Doppler-shifted radio signal received from an orbiting satellite, said satellite receiver system comprising:

a Costas phase-lock loop that receives the radio signal and provides an error signal at an error signal output for controlling a conversion frequency generated by a voltage controlled oscillator;

said voltage controlled oscillator coupled to said Costas phase-lock loop, wherein said voltage controlled oscillator generates the conversion frequency for down-converting the radio signal in said Costas phase-lock loop, and wherein said voltage controlled oscillator comprises a programmable frequency synthesizer that can be programmed to generate a plurality of frequencies selectable in steps; and.

a Doppler frequency acquisition and tracking element coupled to said voltage controlled oscillator, wherein said Doppler frequency acquisition and tracking element adjusts the conversion frequency to compensate for a Doppler frequency shift occurring in the radio signal due to orbital motion of said orbiting satellite, and wherein said Doppler frequency acquisition and tracking element comprises:

a coarse adjustment element coupled to said programmable frequency synthesizer for selecting a suitable one of the plurality of frequencies to provide a coarse adjustment of the conversion frequency to compensate for the Doppler frequency shift; and a fine adjustment element coupled to said error signal output for generating a fine adjustment signal at an adjusted error signal output for providing a fine adjustment of the conversion frequency to compensate for the Doppler frequency shift.

2. The satellite receiver system according to claim 1, wherein said coarse adjustment element comprises:

a power measurement element coupled to said Costas phase-lock loop for measuring received power of the radio signal; and a coarse control element coupled to said power measurement element and coupled to said programmable frequency synthesizer, wherein, at start-up and also in response to the received power being below a predetermined threshold, said coarse control element controls said fine adjustment element to set the fine adjustment signal to a predetermined neutral value, and thereafter controls said synthesizer to generate a predetermined sequence of frequencies from the plurality of frequencies until a frequency that results in a received power above the predetermined threshold is generated.

3. The satellite receiver system according to claim 2, wherein said fine adjustment element comprises:

an error signal monitor coupled to said error signal output for monitoring the error signal to determine whether the error signal is within a first predetermined operating range demarked by low and high limits;

a summing element coupled to said error signal output for summing the fine adjustment signal with the error signal to produce an adjusted error signal at said adjusted error signal output, wherein said adjusted error signal output is coupled to said voltage controlled oscillator for providing the fine adjustment of the conversion frequency; and a fine range control element coupled to said summing element and coupled to said error signal monitor, wherein, after the radio signal has been acquired, said fine range control element decrements the fine adjustment signal by a fine adjustment value equal to the first predetermined operating range in response to the error signal being below the low limit, and increments the fine adjustment signal by the fine adjustment value in response to the error signal being above the high limit, thereby acting to maintain the error signal within the first predetermined operating range.

4. The satellite receiver system according to claim 3, wherein said coarse adjustment element further comprises:

an adjusted error signal monitor coupled to said error signal monitor and coupled to said fine adjustment element for monitoring the adjusted error signal to determine whether the adjusted error signal is within a second predetermined operating range demarked by first and second limits, wherein the conversion frequency corresponding to the first limit is a lower frequency than that corresponding to the second limit; and a coarse range control element coupled to said fine adjustment element and coupled to said adjusted error signal monitor, wherein said coarse range control element controls said synthesizer to generate a next lower one of the plurality of frequencies and simultaneously controls said fine adjustment element to set the adjusted error signal to a value substantially equal to the second limit, in response to the adjusted error signal being outside of the second predetermined operating range in a direction beyond the first limit.

5. A satellite receiver system that provides acquisition and frequency tracking of a Doppler-shifted radio signal received from an orbiting satellite, said satellite receiver system comprising:

a Costas phase-lock loop that receives the radio signal and provides an error signal at an error signal output for controlling a conversion frequency generated by a voltage controlled oscillator;

said voltage controlled oscillator coupled to said Costas phase-lock loop, wherein said voltage controlled oscillator generates the conversion frequency for down-converting the radio signal in said Costas phase-lock loop; and Doppler frequency acquisition and tracking means coupled to said voltage controlled oscillator, wherein said Doppler frequency acquisition and tracking means adjusts the conversion frequency to compensate for a Doppler frequency shift occurring in the radio signal due to orbital motion of said orbiting satellite, and wherein said Doppler frequency acquisition and tracking means comprises fine adjustment means coupled to said error signal output for generating a fine adjustment signal at an adjusted error signal output for providing fine adjustment of the conversion frequency to compensate for the Doppler frequency shift.

6. The satellite receiver system according to claim 5, wherein said voltage controlled oscillator comprises a programmable frequency synthesizer that can be programmed to generate a plurality of frequencies selectable in steps, and wherein said Doppler frequency acquisition and tracking means further comprises coarse adjustment means coupled to said programmable frequency synthesizer for selecting a suitable one of the plurality of frequencies to provide a coarse adjustment of the conversion frequency to compensate for the Doppler frequency shift.

7. The satellite receiver system according to claim 6, wherein said coarse adjustment means comprises:

power measurement means coupled to said Costas phase-lock loop for measuring received power of the radio signal; and coarse control means coupled to said power measurement means and coupled to said programmable frequency synthesizer, wherein, at start-up and also in response to the received power being below a predetermined threshold, said coarse control means controls said fine adjustment means to set the fine adjustment signal to a predetermined neutral value, and thereafter controls said synthesizer to generate a predetermined sequence of frequencies from the plurality of frequencies until a frequency that results in a received power above the predetermined threshold is generated.

8. The satellite receiver system according to claim 7, wherein said fine adjustment means comprises:

error signal monitor means coupled to said error signal output for monitoring the error signal to determine whether the error signal is within a first predetermined operating range demarked by low and high limits;

summing means coupled to said error signal output for summing the fine adjustment signal with the error signal to produce an adjusted error signal at said adjusted error signal output, wherein said adjusted error signal output is coupled to said voltage controlled oscillator for providing the fine adjustment of the conversion frequency; and fine range control means coupled to said summing means and coupled to said error signal monitor means, wherein, after the radio signal has been acquired, said fine range control means decrements the fine adjustment signal by a fine adjustment value equal to the first predetermined operating range in response to the error signal being below the low limit, and increments the fine adjustment signal by the fine adjustment value in response to the error signal being above the high limit, thereby acting to maintain the error signal within the first predetermined operating range.

9. The satellite receiver system according to claim 8, wherein said coarse adjustment means further comprises:

adjusted error signal monitor means coupled to said error signal monitor means and coupled to said fine adjustment means for monitoring the adjusted error signal to determine whether the adjusted error signal is within a second predetermined operating range demarked by first and second limits, wherein the conversion frequency corresponding to the first limit is a lower frequency than that corresponding to the second limit; and coarse range control means coupled to said fine adjustment means and coupled to said adjusted error signal monitor means, wherein said coarse range control means controls said synthesizer to generate a next lower one of the plurality of frequencies and simultaneously controls said fine adjustment means to set the adjusted error signal to a value substantially equal to the second limit, in response to the adjusted error signal being outside of the second predetermined operating range in a direction beyond the first limit.

10. The satellite receiver system according to claim 9, wherein the radio signal comprises information carried in modulation of a type selected from the group consisting of binary phase-shift keyed (BPSK) modulation, double sideband amplitude modulation, and differentially encoded BPSK modulation, and wherein said Costas phase-lock loop comprises demodulation means for demodulating the radio signal to derive the information.

11. A satellite receiver system that provides acquisition and frequency tracking of a Doppler-shifted radio signal received from an orbiting satellite, said satellite receiver system comprising:

a Costas phase-lock loop that receives the radio signal and provides an error signal at an error signal output for controlling a conversion frequency generated by a voltage controlled oscillator;

said voltage controlled oscillator coupled to said Costas phase-lock loop, wherein said voltage controlled oscillator generates the conversion frequency for down-converting the radio signal in said Costas phase-lock loop; and a Doppler frequency acquisition and tracking element coupled to said voltage controlled oscillator, wherein said Doppler frequency acquisition and tracking element adjusts the conversion frequency to compensate for a Doppler frequency shift occurring in the radio signal due to orbital motion of said orbiting satellite, and wherein said Doppler frequency acquisition and tracking element comprises a fine adjustment element coupled to said error signal output for generating a fine adjustment signal at an adjusted error signal output for providing fine adjustment of the conversion frequency to compensate for the Doppler frequency shift.

12. The satellite receiver system according to claim 11, wherein said voltage controlled oscillator comprises a programmable frequency synthesizer that can be programmed to generate a plurality of frequencies selectable in steps, and wherein said Doppler frequency acquisition and tracking element further comprises a coarse adjustment element coupled to said programmable frequency synthesizer for selecting a suitable one of the plurality of frequencies to provide a coarse adjustment of the conversion frequency to compensate for the Doppler frequency shift.

13. The satellite receiver system according to claim 12, wherein said coarse adjustment element comprises:

a power measurement element coupled to said Costas phase-lock loop for measuring received power of the radio signal; and a coarse control element coupled to said power measurement element and coupled to said programmable frequency synthesizer, wherein, at start-up and also in response to the received power being below a predetermined threshold, said coarse control element controls said fine adjustment element to set the fine adjustment signal to a predetermined neutral value, and thereafter controls said synthesizer to generate a predetermined sequence of frequencies from the plurality of frequencies until a frequency that results in a received power above the predetermined threshold is generated.

14. The satellite receiver system according to claim 13, wherein said fine adjustment element comprises:

an error signal monitor coupled to said error signal output for monitoring the error signal to determine whether the error signal is within a first predetermined operating range demarked by low and high limits;

a summing element coupled to said error signal output for summing the fine adjustment signal with the error signal to produce an adjusted error signal at said adjusted error signal output, wherein said adjusted error signal output is coupled to said voltage controlled oscillator for providing the fine adjustment of the conversion frequency; and a fine range control element coupled to said summing element and coupled to said error signal monitor, wherein, after the radio signal has been acquired, said fine range control element decrements the fine adjustment signal by a fine adjustment value equal to the first predetermined operating range in response to the error signal being below the low limit, and increments the fine adjustment signal by the fine adjustment value in response to the error signal being above the high limit, thereby acting to maintain the error signal within the first predetermined operating range.

15. The satellite receiver system according to claim 14, wherein said coarse adjustment element further comprises:

an adjusted error signal monitor coupled to said error signal monitor and coupled to said fine adjustment element for monitoring the adjusted error signal to determine whether the adjusted error signal is within a second predetermined operating range demarked by first and second limits, wherein the conversion frequency corresponding to the first limit is a lower frequency than that corresponding to the second limit; and a coarse range control element coupled to said fine adjustment element and coupled to said adjusted error signal monitor, wherein said coarse range control element controls said synthesizer to generate a next lower one of the plurality of frequencies and simultaneously controls said fine adjustment element to set the adjusted error signal to a value substantially equal to the second limit, in response to the adjusted error signal being outside of the second predetermined operating range in a direction beyond the first limit.

16. The satellite receiver system according to claim 15, wherein the radio signal comprises information carried in modulation of a type selected from the group consisting of binary phase-shift keyed (BPSK) modulation, double sideband amplitude modulation, and differentially encoded BPSK modulation, and wherein said Costas phase-lock loop comprises a demodulation element for demodulating the radio signal to derive the information.

* * * * *